United States Patent
Okamura et al.

(10) Patent No.: US 9,662,699 B2
(45) Date of Patent: *May 30, 2017

(54) RESIN-COATED A1 PLATE FOR DRAWN AND IRONED CAN WITH EXCELLENT LUSTER AND METHOD FOR PRODUCING DRAWN AND IRONED CAN

(75) Inventors: Takaaki Okamura, Yamaguchi (JP); Hiroaki Togo, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/634,537

(22) PCT Filed: Mar. 16, 2011

(86) PCT No.: PCT/JP2011/001559
§ 371 (c)(1),
(2), (4) Date: Nov. 19, 2012

(87) PCT Pub. No.: WO2011/118160
PCT Pub. Date: Sep. 29, 2011

(65) Prior Publication Data
US 2013/0164497 A1 Jun. 27, 2013

(30) Foreign Application Priority Data

Mar. 26, 2010 (JP) .................. 2010-071764

(51) Int. Cl.
| B32B 15/08 | (2006.01) |
| B32B 15/09 | (2006.01) |
| B21D 24/00 | (2006.01) |
| B32B 3/00 | (2006.01) |
| B65D 1/16 | (2006.01) |
| B65D 25/34 | (2006.01) |
| B32B 15/20 | (2006.01) |

(52) U.S. Cl.
CPC ............. B21D 24/00 (2013.01); B32B 3/00 (2013.01); B32B 15/08 (2013.01); B32B 15/20 (2013.01); B65D 1/165 (2013.01); B65D 25/34 (2013.01); *B05D 2202/25* (2013.01); *B05D 2701/00* (2013.01); *B32B 2439/66* (2013.01); *Y10T 428/24355* (2015.01)

(58) Field of Classification Search
CPC ........ B05D 2202/25; B05D 2701/00–2701/10; B32B 2439/66
USPC ........................................................ 72/274
See application file for complete search history.

(56) References Cited

U.S. PATENT DOCUMENTS

| 3,563,785 | A * | 2/1971 | Oga et al. ............. B05D 1/32 148/251 |
| 4,230,758 | A * | 10/1980 | Nagai .................. B05D 5/086 216/103 |
| 4,897,316 | A * | 1/1990 | Kagechika ............. B21B 1/22 428/612 |
| 5,179,854 | A * | 1/1993 | Matsui .................. B21D 22/28 72/349 |
| 5,390,518 | A * | 2/1995 | Morimoto ............. B21B 1/227 72/20.1 |
| 5,686,194 | A * | 11/1997 | Shimizu ................ B32B 15/08 420/103 |
| 6,334,910 | B1 * | 1/2002 | Sato .................... C21D 8/0278 148/320 |
| 6,372,326 | B1 * | 4/2002 | Kosuge ................. B32B 15/08 428/141 |
| 7,182,475 | B2 * | 2/2007 | Kramer et al. ............... 359/507 |
| 2001/0051278 | A1 * | 12/2001 | Komai ................... B32B 15/08 428/458 |
| 2006/0088724 | A1 * | 4/2006 | Yannetti ................. B32B 15/08 428/624 |
| 2006/0172100 | A1 * | 8/2006 | Hu .......................... B05D 7/14 428/35.8 |
| 2006/0230800 | A1 * | 10/2006 | Chichiki ................ B05D 5/067 72/46 |
| 2010/0310824 | A1 * | 12/2010 | Oshima .................. B32B 27/36 428/141 |
| 2010/0330413 | A1 * | 12/2010 | Gong .................... C09D 7/1216 429/163 |
| 2012/0168053 | A1 * | 7/2012 | Kochiyama ............ B32B 15/08 156/60 |

FOREIGN PATENT DOCUMENTS

| JP | 63143290 A | * | 6/1988 |
| JP | 11100630 A | * | 4/1999 |
| JP | 2001009968 A | * | 1/2001 |
| JP | 2002143904 A | * | 5/2002 |
| JP | 2003-025490 A | | 1/2003 |
| JP | 2003-034322 A | | 2/2003 |
| JP | 2003053401 A | * | 2/2003 |
| JP | 2004-160922 A | | 6/2004 |
| JP | 2005-153319 A | | 6/2005 |
| JP | 2007-182595 A | | 7/2007 |

OTHER PUBLICATIONS

Properties of PETI from Chemical Abstract Services, retrieved Jan. 28, 2014 via Sci-Finder. NPL_CAS_PETI.*

(Continued)

*Primary Examiner* — Aaron Austin
*Assistant Examiner* — Zheren J Yang
(74) *Attorney, Agent, or Firm* — Intellectual Property Law Group LLP

(57) ABSTRACT

Disclosed is a resin-coated Al sheet with which a drawn and ironed can having a lustrous appearance can be formed. An upper limit of a thickness of an outer surface resin layer which covers an Al surface which becomes an outer surface of the can and has an arithmetical mean roughness (Ra) of 0.5 μm or less with a thickness which falls within a range of 0.02 μm to 6 μm is determined based on an arithmetical mean roughness (Ra) of the Al surface, wherein the upper limit of the thickness of a coating outer-surface resin layer is decreased when the arithmetical mean roughness (Ra) is increased.

2 Claims, No Drawings

(56) References Cited

OTHER PUBLICATIONS

NPL from CAS on property of PETI. Retrieved via Sci-Finder on Feb. 14, 2014.*
Machine Translation of JP 2003/053401 A. Obtained from Industrial Property Digital Library of the JPO. Retrieved on Dec. 8, 2014.*
Machine translation of JP 2002/143904 A. Obtained from Industrial Property Digital Library of the JPO on Oct. 28, 2015.*
International Search Report with English translation, mailing date Jun. 28, 2011, for corresponding International Application No. PCT/JP2011/001559.

* cited by examiner

RESIN-COATED Al PLATE FOR DRAWN AND IRONED CAN WITH EXCELLENT LUSTER AND METHOD FOR PRODUCING DRAWN AND IRONED CAN

CROSS-REFERENCE TO RELATED APPLICATIONS

This application is a U.S. National Phase application, under 35 U.S.C. §371, of International Application no. PCT/JP2011/001559, with an international filing date of Mar. 16, 2011, and claims benefit of Japanese Application no. JP 2010-071764 filed on Mar. 26, 2010, and which are hereby incorporated by reference for all purposes.

TECHNICAL FIELD

The present invention relates to a resin-coated Al sheet for a drawn and ironed can capable of exhibiting excellent luster when the Al sheet is formed into a can body by drawing and ironing, and a method of manufacturing the drawn and ironed can, and more particularly to a resin-coated Al sheet for a drawn and ironed can suitable for forming a drawn and ironed can whose barrel portion exhibits excellent luster by dry lubrication without using a liquid coolant and a method of manufacturing the drawn and ironed can.

BACKGROUND ART

With respect to a metal can container for beverage, in general, as a can having no seams on a side thereof (seamless can), there has been known a drawn and ironed can (DI) where a metal sheet such as an Al sheet, a tinned sheet or the like is subjected to drawing of at least one stage between a drawing die and a punch so that the metal sheet is formed into a cup constituted of a barrel portion having no seams on a side surface thereof and a bottom portion which is integrally connected with the barrel portion with no seams, ironing is applied to the barrel portion between an ironing punch and an ironing die when necessary thus decreasing a thickness of the barrel portion of a container.

There has been also known a drawn and ironed can which uses a resin-coated metal sheet where a metal sheet is covered with a resin. While friction between a metal sheet and a tool is reduced by using a liquid coolant in applying drawing and ironing to a metal sheet, in applying drawing and ironing to such a resin-coated metal sheet, a wax or the like is applied to the resin-coated metal sheet as a lubricant, and drawing and ironing are applied to the resin-coated metal sheet in a dry state.

However, to apply ironing to the resin-coated metal sheet in such a dry state, it is necessary for the resin-coated metal sheet to withstand the severe working. For example, patent document 1 discloses a coated metal sheet where a thickness of a coating film on a surface of a sheet material, a plating condition, a film strength and the like are studied aiming at drawing and ironing under such a dry condition.

PATENT DOCUMENT

Patent document 1: JP-A-2003-34322

SUMMARY OF THE INVENTION

Problems that the Invention is to Solve

Recently, there has been a strong demand for a can having lustrous appearance. In a coated metal sheet disclosed in the above-mentioned patent document 1, an Al sheet which can easily exhibit luster is used as a metal sheet. However, a film thickness of an outer surface coating film and a material condition such as surface roughness of Al which are requisites for allowing the appearance of a barrel portion of a container to exhibit luster after working are not taken into consideration at all. In view of the above, it is difficult to provide a precoating material which can cope with recent needs for higher luster on a can, and to provide a drawn and ironed can which exhibits excellent lustrous appearance in a stable manner by drawing and ironing the precoating material under a dry condition.

Accordingly, it is an object of the present invention to provide a resin-coated Al sheet for a drawn and ironed can where the appearance of a side wall portion of the can exhibits the excellent luster by drawing and ironing a precoating material under a dry condition which is formed in such a manner that an Al sheet is used as a metal sheet and a resin layer is formed on an outer surface and an inner surface of the Al sheet, and a method of manufacturing the drawn and ironed can.

Means for Solving the Problems (A) A resin-coated Al sheet for a drawn and ironed can exhibiting excellent luster according to the present invention is characterized in that the resin-coated Al sheet for a drawn and ironed can is a resin-coated Al sheet for a drawn and ironed can which is formed into a can body by drawing and ironing, an Al surface which forms an outer surface of the can and has an arithmetical mean roughness (Ra) of 0.5 µm or less is covered with an outer surface resin layer having a thickness which falls within a range of 0.02 µm to 6 µm, and any one of following conditions is satisfied.

(1) an arithmetical mean roughness (Ra) of the Al surface being less than 0.2 µm and a thickness of the resin layer being 6 µm or less, (2) the arithmetical mean roughness (Ra) of the Al surface being within a range from 0.2 µm to less than 0.3 µm and the thickness of the resin layer being 4 µm or less, and (3) the arithmetical mean roughness (Ra) of the Al surface being within a range from 0.3 µm to 0.5 µm and the thickness of the resin layer being 2 µm or less.

(B) The resin-coated Al sheet for a drawn and ironed can exhibiting excellent luster according to the present invention is, in the above-mentioned (A), characterized in that the arithmetical mean roughness (Ra) of the Al surface is less than 0.2 µm, and the thickness of the outer-surface resin layer being within a range from 0.1 µm to 2 µm.

(C) The resin-coated Al sheet for a drawn and ironed can exhibiting excellent luster according to the present invention is, in the above-mentioned (A) or (B), characterized in that a glass transition temperature of the outer surface resin layer is 40° C. or more.

(D) The resin-coated Al sheet for a drawn and ironed can exhibiting excellent luster according to the present invention is, in any one of the above-mentioned (A) to (C), characterized in that the number of peaks of recessed portions having a peak height of 0.1 µm or more on the Al surface is equal 10 pieces/mm or less.

(E) A method of manufacturing a drawn and ironed can exhibiting excellent luster according to the present invention is characterized in that a resin-coated Al sheet in which an Al surface which forms an outer surface of the can and has an arithmetical mean roughness (Ra) of 0.5 µm or less is covered with an outer surface resin layer having a thickness which falls within a range of 0.02 μm to 6 μm, and any one of following conditions is satisfied, (1) an arithmetical mean roughness (Ra) of the Al surface being less than 0.2 μm and a thickness of the resin layer being 6 μm or less, (2) the arithmetical mean roughness (Ra) of the Al surface being within a range from 0.2 μm to less than 0.3 μm and the thickness of the resin layer being 4 μm or less, and (3) the arithmetical mean roughness (Ra) of the Al surface being within a range from 0.3 μm to 0.5 μm and the thickness of the resin layer being 2 μm or less, is subjected to drawing and ironing thus forming the resin-coated Al sheet into a can body, wherein the drawing and ironing are performed such that regular reflectance of a barrel portion of the can body after working is 15% or more.

Advantage of the Invention

Conventionally, in a resin-coated metal sheet, due to the presence of a resin layer above an Al surface, crystal grains of the Al surface generate roughing which is caused by the deformation of the crystal grains at the time of drawing and ironing. Accordingly, the Al surface becomes a surface which generates the irregular reflection of light and hence, it is difficult to obtain a formed can having excellent luster after ironing.

The present invention has an advantageous effect the movement of crystal grains on the Al surface is suppressed so that the surface receives a large ironing action. Inventors of the present invention have found that by taking into account not only making a thickness and physical properties of an outer surface resin layer proper but also the surface roughness of the metal sheet before molding, conditions relating to the resin layer formed on the metal sheet are also alleviated and the excellent luster can be also obtained.

According to the present invention, it is possible to provide a precoating material which can, without narrowing an application condition of an outer surface resin layer more than necessity, cope with a demand for luster equivalent to luster of a drawn and ironed can made of a conventional non-precoating material or a demand for more excellent luster thus acquiring large advantages including an advantage that spray coating on an inner surface of a can after forming can be eliminated.

MODE FOR CARRYING OUT THE INVENTION

The compound Al material for a drawn and ironed can according to the present invention is a resin-coated Al sheet used for forming a drawn and ironed can, wherein an Al surface which forms an outer surface of the can and has an arithmetical mean roughness (Ra) of 0.5 μm or less is covered with an outer surface resin layer having a thickness which falls within a range of 0.02 μm to 6 μm. When the arithmetical mean roughness (Ra) exceeds 0.5 μm or the thickness of the outer surface resin layer exceeds 6 μm, there exists a tendency that luster is sharply lowered and hence, such values are not desirable. The gist of the present invention lies in the finding that, to exhibit the favorable lustrous appearance, it is necessary for the compound AL material for a formed can not only to set a film thickness of the outer surface resin layer to a fixed value or less but also to set the arithmetical mean roughness (Ra) of Al coated on the outer surface resin layer to a fixed value or less.

The gist of the present invention also lies in the finding that, to obtain a formed can having stable luster, it is necessary to decide an upper-limit thickness of the outer surface resin layer in three stages corresponding to the arithmetical mean roughness (Ra) of Al coated on the outer surface resin layer.

It is found that when the arithmetical mean roughness (Ra) of the Al surface is less than 0.2 μm, an upper-limit thickness of the outer surface resin layer with which a luster that the present invention aims at can be acquired is 6 μm, and when the arithmetical mean roughness (Ra) exceeds 0.2 μM, it is difficult to obtain the target luster can. As a result of various studies made to overcome such a drawback, it is found that the arithmetical mean roughness (Ra) and the upper-limit thickness of the outer surface resin layer largely influence the luster of a formed can. Inventors of the present invention also have found that it is necessary to decide the upper-limit thickness of the outer surface resin layer corresponding to the arithmetical mean roughness (Ra) of the Al surface. As a result of studies with respect to a specific method of making such a decision, as explained hereinafter, the inventors of the present invention have found that by classifying the arithmetical mean roughness (Ra) of the Al surface into three stages, and deciding the upper-limit thickness of the outer surface resin layer corresponding to these arithmetical mean roughnesses (Ra), a target luster can is obtainable in a most stable and easiest manner.

<Upper Limit Thickness of Resin Layer Coated on Al Surface of Resin Coated Al Sheet which Becomes Outer Surface of Can>

1) An upper limit thickness of a coated resin layer is 6 μm when the arithmetical mean roughness (Ra) of the Al surface is less than 0.2 μm, 2) The upper limit thickness of the coated resin layer is 4 μm when the arithmetical mean roughness (Ra) of the Al surface is within a range from 0.2 μm to less than 0.3 μm, and 3) the upper limit thickness of the coated resin layer is 2 μm when the arithmetical mean roughness (Ra) of the Al surface is within a range from 0.3 μm to 0.5 μm.

The arithmetical mean roughness (Ra) used in the present invention means a value which is measured in the direction perpendicular to the rolling direction of the Al sheet in accordance with ISO-'97.

Further, a glass transition temperature of the outer surface resin layer used in the present invention is 40° C. or more, and more preferably 70° C. or more. Although it depends on a temperature or a flow rate of cooling water for a punch or a die or a forming speed at the time of drawing and ironing, when a general-type drawing and ironing device is used without using a special device, there may be a case where the following non-ironing working state is observed. That is, in the non-ironing working state, a temperature of the outer surface resin layer is elevated due to a forming heat so that the outer surface resin layer is softened and thereby an ironing action which is applied to Al through the outer-surface resin layer between the punch and the die is almost eliminated so that a smoothing effect becomes poor whereby luster is not generated. Even when the glass transition temperature of the outer surface resin layer is 20° C. or less, the prevention of the non-ironing working state can be achieved at least in an initial forming period depending on a condition, and luster can be achieved to some extent. However, to acquire the sufficient luster, it is preferable to set the glass transition temperature to 40° C. or more.

Further, to consider a case where cans are manufactured in a stable manner at a speed of 100 cans/min or more, by also taking into account a production speed, it is more preferable to set the glass transition temperature of the outer surface resin layer to 70° C. or more.

The glass transition temperature used in the present invention means a value measured using the resin layer studied in the present invention as an object to be measured in accordance with JIS C 6481-1996 using a TMA device of TAS-300 produced by Rigaku Corporation.

The outer surface resin layer which can be used in the present invention becomes a protective layer of a drawn and ironed can, wherein the resin layer per se is subjected to severe ironing. Accordingly, it is desirable that the outer surface resin layer has elongation to some extent, and it is preferable that the resin layer has a rapture elongation of 5% or more at 25° C. particularly when measured in accordance with ASTM, D-882.

Further, the resin layer preferably has Martens hardness of 50 N/mm$^2$ or more at 28° C., and more preferably has Martens hardness of 100 N/mm$^2$ or more at 28° C. By setting Martens hardness of the resin layer in such a manner, a smoothing effect of the Al sheet by way of the resin layer can be further enhanced and hence, regular reflectance, that is, luster of a drawn and ironed can be further enhanced.

Here, Martens hardness is a value obtained by measuring Martens hardness of a resin layer with a maximum load which satisfies a condition that a pushing depth of a Berkovich indenter is equal to or less than 1/10 of a measurement coating film in accordance with ISO14577-2002 using the ultra fine pushing hardness tester ENT-1100a made by ELIONIX INC.

A Berkovich indenter where a correction length (Δhc) indicative of wear of the indenter is 15 nm or less is used.

Further, it is desirable that the resin layer has excellent adhesiveness with a metal material, particularly, excellent thermal adhesiveness with a metal material, and it is preferable that the concentration of a carbonyl group in the resin be 10 meq/100 g resin or more.

As a resin which can be used for forming the first resin layer of the present invention, the following resins can be named although the present invention is not limited to these resins. The resin may be decided by taking the required performance and economical efficiency into consideration.

That is, a polyester group such as polyethylene terephthalate, polyethylene terephthalate/iso phthalate, poly tetramethylene terephthalate, polyethylene/tetramethylene terephthalate, poly tetramethylene terephthalate/isophthalate, poly tetramethylene/ethylene terephthalate, polyethylene/tetramethylene terephthalate/isophthalate, polyethylene/oxybenzoate or the mixture of these resins; a polycarbonate group such as poly-p-xylylene glycol bis carbonate, poly-dihydroxy diphenyl-methane carbonate, poly-dihydroxy diphenol 2,2-propane carbonate, poly-dihydroxy diphenyl 1,1-ethane carbonate; a polyamide group such as poly-ω-aminocaproic acid, poly-ω-aminoheptanoic acid, poly-ω-amino caprylic acid, poly-ω-aminopelagonic acid, poly-ω-amino decanoic acid, poly-ω-aminoundecanoic acid, poly-ω-amino dodecanoic acid, poly-ω-amino tridecanic acid, polyhexamethylene adipamide, polyhexamethylene sebacamide, polyhexamethylene dodecamide, polyhexamethylene tridecamide, polydecamethylene adipamido, polydecamethylene sebacamide, polydecamethylene dodecamide, polydecamethylene tridecamide, polydodecamethylene adipamide, polydodecamethylene sebacamide, polydodecamethylene dodecamide, polytridecamethylene adipamide, polytridecamethylene sebacamide, polytridecamethylene dodecamide, polydodecamethylene azelamide, polytridecamethylene azelamide, copolyamide of these resins; a poly-amidimide resin, an acrylic resin, a urethane acrylate resin, an epoxy resin or the like can be named.

These resins may be used in mixture or in plural layers. Further, these resins may adopt the laminated structure where individual resins are laminated to each other.

The outer surface resin layer on the resin coated Al sheet according to the present invention is formed by coating a paint produced by resolving a resin component in a solvent, an aqueous dispersion body in which a resin component is dispersed or a paint made of a 100% solid component such as a ultraviolet curing paint to the Al sheet or, by laminating a resin layer which is formed into a film in advance on the Al sheet or by directly coating a resin to the Al sheet by extrusion.

In the present invention, most desirable ranges for the arithmetical mean roughness (Ra) and a thickness of the resin layer which covers the Al surface which becomes an outer surface of a can are set such that the arithmetical mean roughness (Ra) is less than 0.2 μm and the thickness of the coating resin layer is set to a value within 0.1 μm to 2 μm from a viewpoint of luster and stable formability, and a formed can having uniform and excellent lustrous appearance can be obtained in a stable manner. When the arithmetical mean roughness (Ra) exceeds 0.2 μm, it is difficult to obtain a formed can having high luster with regular reflectance of 40% or more which is obtainable by drawing and ironing only a conventional Al sheet without using a precoating material, or even when the formed can be obtained, a range of conditions imposed on the outer surface resin layer becomes extremely limited.

Further, even when the arithmetical mean roughness (Ra) is less than 0.2 μm, when a thickness of the coating resin layer exceeds 2 μm, it is difficult to obtain a formed can having high luster which exhibits regular reflectance of 40% or more. Further, when a thickness of the coating resin becomes less than 0.1 μm, the resin layer is liable to be influenced by the adhesion of a foreign substance, and the outer surface resin film is abraded due to the adhesion of foreign substances or the like so that longitudinal stripes are liable to be formed on the formed can and hence, it is necessary to pay attentions on the formed can. Accordingly, it is preferable to set the thickness of the coating resin layer to 0.1 μm or more to acquire the stable formability.

On the other hand, the Al condition before the outer surface resin layer is formed on the Al sheet which decides the luster of a formed can is mainly the above-mentioned arithmetical mean roughness (Ra), it is found that there is a tendency that the higher the quality of the outer surface resin layer becomes, that is, the smaller the number of fine recessed portions and projections even with the same arithmetical mean roughness (Ra), the more the luster is improved. Particularly, compared to the projections which are liable to be smoothened by ironing, it is necessary to pay attentions to the number of recessed portions which are liable to remain even after ironing. Although mechanical rolling can also decrease the number of fine recessed portions to some extent, chemical etching of the Al surface is effective. Compared to a control of the arithmetical mean roughness (Ra) by simple mechanical rolling, a control of fine recessed portions and projections by chemical etching is difficult, takes time, and lowers productivity thus giving rise to lowering of economical efficiency. Accordingly, when viewed in a comprehensive manner, it is not always true that chemical etching is more suitable than mechanical rolling in the control of the Al surface. However, the remarkably enhanced luster can be obtained with chemical etching compared to a case where only the arithmetical mean roughness Ra is controlled and hence, when the high luster is particularly required or the like, the reduction of the number of fine recessed portions and projections, particularly, the number of peaks of recessed portions by chemical etching by taking into account required performance and economical efficiency is an effective method. The level of the number of peaks of the recessed portions which is effective in enhancing luster has been studied in various ways. As a result, it is found that an apparent luster enhancing effect is recognized when the number of peaks of the recessed portions having a peak height of 0.1 µm or more is 10 m pieces/mm or less. In the present invention, the number of peaks of the recessed portions having a peak height of 0.1 µm or more means a value which is measured as follows.

<Method of Measuring the Number of Peaks of the Recessed Portions Having a Peak Height of 0.1 µm or More>

Using SURFCOM 1400D-3DF made by TOKYO SEIMITSU CO., LTD., under the following measuring conditions, a roughness curve is drawn with a measuring length of 1 mm, and a peak which goes beyond a center line from a peak count level lower limit value of −0.1 µm from the center line is set as 1 count.

<Measuring Conditions>
calculation standard: ISO-'97 standard
kind of measurement: roughness measurement
cut off type: Gaussian
correction of inclination: least square curve correction
measuring speed: 0.30 mm/s
$\lambda c/\lambda s$: 30
$\lambda c$: 0.08 mm
measuring length: 1 mm
peak count level upper limit value: 0 µm
peak count level lower limit value: −0.1 µm With respect to a metal sheet which is used as a substrate for a resin coated Al sheet according to the present invention, an Al sheet or the like which has been used in the manufacture of a drawn and ironed can conventionally can be used. A sheet thickness of the metal sheet is set to a value which falls within a range from 0.1 to 0.5 mm in general. However, the sheet thickness should be desirably selected corresponding to a usage and hence, the sheet thickness is not particularly limited in this specification.

Post treatment such as chromate treatment, chromate-phosphate treatment, zirconium treatment may be applied to the Al sheet.

<Method of Manufacturing a Resin Coated Al Sheet for a Drawn and Ironed Can>

The resin coated Al sheet according to the present invention can be manufactured through a step where an outer surface resin layer having an upper limit thickness of 6.0 µm is formed on one surface of the Al sheet when an arithmetical mean roughness (Ra) of a surface which constitutes an outer surface of the Al sheet is less than 0.2 µm, an outer surface resin layer having an upper limit thickness of 4.0 µm is formed on one surface of the Al sheet when the arithmetical mean roughness (Ra) is 0.2 µm to less than 0.3 µm or an outer surface resin layer having an upper limit thickness of 2.0 µm is formed on one surface of the Al sheet when the arithmetical mean roughness (Ra) is 0.3 µm to 0.5 µm, and a step where an inner surface resin layer which is brought into contact with a content filled in a can is formed on the other surface of the Al sheet. Although a thickness of the inner surface resin layer is not particularly limited in this specification, the thickness of the inner surface resin layer should be decided by taking into account not only corrosiveness of a content, a preserving condition and required performance but also economical efficiency. Further, with respect to the formation of the inner surface resin layer and the outer surface resin layer, a method where both resin layers are formed by laminating a film to the metal sheet, a method where a paint is applied to both surfaces of the metal sheet, or a method where a film is laminated to either one of the metal sheet and a paint is applied to the other surface of the metal sheet may be used, and the method of forming the inner surface resin layer and the outer surface resin layer is not particularly limited.

Further, from a viewpoint of enhancing adhesiveness and corrosion resistance of the Al sheet, a surface treated layer may be formed on the Al sheet.

As surface treatment, a method where a chromium hydrous oxide film is formed on a metal sheet by immersing treatment in an aqueous solution of dichromic acid salt or electrolytic treatment, a method where a two-layered film consisting of a metal chromium film and a chromium hydrous oxide film is formed on a metal sheet by electrolytic treatment in an aqueous solution of a chromic acid, a method where a thin organic resin layer made of polyacrylic acid, an epoxy resin or the like is formed on a metal sheet, or a method where silane coupling treatment is applied to a metal sheet or the like is named. These surface treatments can be performed using conventionally known methods.

<Method of Manufacturing a Drawn and Ironed Can>

A compound Al material for a drawn and ironed can according to the present invention can be favorably used in forming conventionally known drawn and ironed cans. That is, with the use of the compound Al material for a drawn and ironed can according to the present invention, not to mention that the drawn and ironed cans can be formed using a liquid coolant, cans can be formed with favorable formability in forming the drawn and ironed cans under a dry condition without using a coolant.

That is, a blank which is formed by punching out from a resin coated Al sheet of the present invention is formed into a cup shaped body by drawing using a drawing die in one stage or in plural stages. Next, using ironing die in one or plural stages, a barrel portion of the cup shaped body is forcibly pushed into a clearance portion between the ironing die set smaller than a thickness of the barrel portion of the cup shaped body and a punch thus applying ironing which increases a barrel height to the barrel portion while decreasing a wall thickness of the barrel portion. In this manner, a drawn and ironed can (DI can) which has a relatively small can diameter, a large can barrel portion height and a small barrel portion thickness can be formed.

EXAMPLES

The present invention is explained in detail hereinafter in conjunction with examples.
(Evaluation Item)
[Regular Reflectance of Barrel Portion]

The barrel portion is cut out in the circumferential direction from the formed drawn and ironed can, wherein the cut-out barrel portion has a width of 20 mm starting from a position of 60 mm in height direction from a can bottom of the formed drawn can. The cut-out barrel portion having the width of 20 mm is cut in the can height direction such that the barrel portion is equally divided into eight pieces, and each divided piece is used as a measuring sample.

With respect to a center portion of the measuring sample, using a spectral colorimeter (made by KONICA MINOLTA HOLDINGS, INC., type: CM-3500), total reflectance and diffuse reflectance are measured, and regular reflectance is calculated using a following formula.

regular reflectance (%)=total reflectance (%)−diffuse reflectance (%)

An average value of the regular reflectances of 8-equally-divided samples is calculated by rounding-off, and the rounded-off value is used as the regular reflectance of the barrel portion described in the examples and comparison examples.

According to the present invention, by taking into account a recent demand for strong luster, it is determined that the barrel portion having the regular reflectance of 15% or more, preferably 25% or more has practicability. Further, the barrel portion having the regular reflectance of 40% or more is more preferable because that the barrel portion acquires the substantially equal luster as a can which exhibits favorable lustrous appearance among conventional formed cans made of a non-precoating material.

Example 1

Chromate-phosphate treatment (16 mg/cm$^2$ in terms of Cr) is applied to surfaces of an Al sheet (sheet thickness: 0.28 mm: 3104 alloy material) which becomes inner and outer surfaces of a can thus producing an Al sheet where the surface which becomes the outer surface of the can has an arithmetical mean roughness (Ra) of 0.50 µm and the number of peaks of recessed portions having a depth of 0.1 µm or more is 52 pieces/mm. The Al sheet is heated to a sheet temperature of 220° C., and a non-stretched isophthalic acid/terephthalic acid copolymer polyester film (melting point: 210° C., film thickness: 12 µm) made by Toyo Kohan Co., Ltd. is applied to the surface of the Al sheet which becomes the inner surface of the can by coating and is cooled thus forming an inner surface resin layer, and urethane modified polyester resin having a glass transition temperature of 106° C. shown in Table 1 is applied to the surface of the Al sheet which becomes the outer surface of the can as a paint such that a dry thickness of the resin film becomes 2 µm and, thereafter, the resin film is dried at a temperature of 150° C. for 30 seconds thus forming an outer surface resin layer whereby a resin coated Al sheet is obtained.

50 mg/m$^2$ of glamour wax is applied to both surfaces of the resin coated Al sheet and, thereafter, drawing and ironing are applied to the resin coated Al sheet in dry atmosphere under the following forming conditions such that the inner surface of the can becomes the surface coated with the copolymer polyester film made by Toyo Kohan Co., Ltd. thus obtaining a drawn and ironed can.

A result obtained by measuring regular reflectance of an outer surface of the drawn and ironed can by the above-mentioned method is shown in Table 1, wherein the regular reflectance of a can barrel portion is 17.2% so that the drawn and ironed can acquires favorable lustrous appearance.

<Drawing and Ironing Conditions>
1. forming temperature: temperature of a punch immediately before forming: 45° C.
2. die temperature: 40° C.
3. blank diameter: 142 mm
4. drawing condition: 1$^{st}$ drawing ratio: 1.56, second drawing ratio: 1.38
5. ironing punch diameter: 66 mm
6. total ironing ratio: 63% (center portion of side wall)
7. can forming speed: 200 cpm Example 2

Except for that a thickness of an outer surface coating film is set to 0.25 µm as shown in Table 1, a resin coated Al sheet is prepared in the same manner as the example 1, and drawing and ironing are applied to the resin coated Al sheet in the same manner as the example 1 thus obtaining a drawn and ironed can.

A result obtained by evaluating regular reflectance of the drawn and ironed can in the same manner as the example 1 is shown in Table 1, wherein a can barrel portion exhibits regular reflectance of 38.2% which is far higher than the regular reflectance of the can barrel portion in the example 1 due to the reduction of a film thickness of the outer surface coating film so that the drawn and ironed can acquires favorable lustrous appearance.

Example 3

Except for that an Al sheet where an arithmetical mean roughness (Ra) is 0.3 µm and the number of peaks of the recessed portion is 45 pieces/mm is used, a resin coated Al sheet is prepared in the same manner as the example 1, and drawing and ironing are applied to the resin coated Al sheet in the same manner as the example 1 thus obtaining a drawn and ironed can.

A result obtained by evaluating regular reflectance of the drawn and ironed can in the same manner as the example 1 is shown in Table 1, wherein a can barrel portion exhibits regular reflectance of 22.5% which is higher than the regular reflectance of the can barrel portion in the example 1 due to smoothing of the Al sheet so that the drawn and ironed can acquires favorable lustrous appearance.

Example 4

Except for that an Al sheet where an arithmetical mean roughness (Ra) is 0.25 µm and the number of peaks of the recessed portion is 43 pieces/mm is used, a resin coated Al sheet is prepared in the same manner as the example 1, and drawing and ironing are applied to the resin coated Al sheet in the same manner as the example 1 thus obtaining a drawn and ironed can.

A result obtained by evaluating regular reflectance of the drawn and ironed can in the same manner as the example 1 is shown in Table 1, wherein a can barrel portion exhibits regular reflectance of 25.8% which is higher than the regular reflectance of the can barrel portion in the example 1 due to smoothing of the Al sheet so that the drawn and ironed can acquires favorable lustrous appearance.

Example 5

Except for that an Al sheet where a thickness of an outer surface resin layer is 4 µm is used, a resin coated Al sheet is prepared in the same manner as the example 4, and drawing and ironing are applied to the resin coated Al sheet in the same manner as the example 1 thus obtaining a drawn and ironed can.

A result obtained by evaluating regular reflectance of the drawn and ironed can in the same manner as the example 1 is shown in Table 1, wherein although a can barrel portion exhibits regular reflectance lower than the regular reflectance in the example 4 due to the increase of a film thickness of an outer surface coating film, the can barrel portion exhibits regular reflectance of 20.5% so that the drawn and ironed can acquires favorable lustrous appearance.

Embodiments 6 to 8

Except for that an Al sheet where an arithmetical mean roughness (Ra) is 0.2 µm and the number of peaks of the recessed portion is 40 pieces/mm is used and a thickness of an outer surface resin layer is set to 2 μm, 4 μm and 0.25 μm respectively as shown in Table 1, a resin coated Al sheet is prepared in the same manner as the example 1, and drawing and ironing are applied to the resin coated Al sheet in the same manner as the example 1 thus obtaining a drawn and ironed can.

A result obtained by evaluating regular reflectance of the drawn and ironed can in the same manner as the example 1 is shown in Table 1, wherein can barrel portions exhibit regular reflectances of 27.8%, 18.7%, 42.2% respectively so that the drawn and ironed cans acquire favorable lustrous appearance respectively.

Embodiments 9 to 11

Except for that an Al sheet where an arithmetical mean roughness (Ra) is 0.15 μm and the number of peaks of the recessed portion is 38 pieces/mm is used and a thickness of an outer surface resin layer is set to 6 μm, 2 μm and 0.25 μm respectively as shown in Table 1, a resin coated Al sheet is prepared in the same manner as the example 1, and drawing and ironing are applied to the resin coated Al sheet in the same manner as the example 1 thus obtaining a drawn and ironed can.

A result obtained by evaluating regular reflectance of the drawn and ironed can in the same manner as the example 1 is shown in Table 1, wherein can barrel portions exhibit regular reflectances of 16.5%, 28.4%, 45.3% respectively so that the drawn and ironed cans acquire favorable lustrous appearance respectively.

Embodiments 12 to 13

As shown in Table 1, except for that an Al sheet where an arithmetical mean roughness (Ra) is 0.03 μm and the number of peaks of the recessed portion is 17 pieces/mm and 3 pieces/mm is used, a resin coated Al sheet is prepared in the same manner as the example 11, and drawing and ironing are applied to the resin coated Al sheet in the same manner as the example 1 thus obtaining a drawn and ironed can.

A result obtained by evaluating regular reflectance of the drawn and ironed can in the same manner as the example 1 is shown in Table 1, wherein can barrel portions exhibit regular reflectances of 50.4%, 56.5% respectively so that the drawn and ironed cans acquire favorable lustrous appearance respectively.

Embodiments 14 to 17

Except for that, in respective embodiments, an outer surface resin layer is made of a polyester resin having a glass transition temperature of 84° C., 40° C., 18° C. or a polyether sulfone resin having a glass transition temperature of 225° C. is used, a resin coated Al sheet is prepared in the same manner as the example 12, and drawing and ironing are applied to the resin coated Al sheet in the same manner as the example 1 thus obtaining a drawn and ironed can.

A result obtained by evaluating regular reflectance of the drawn and ironed can in the same manner as the example 1 is shown in Table 1, wherein can barrel portions exhibit regular reflectances of 44.3%, 31.6%, 21.5%, 52.2% respectively. Although there is observed tendency that the high regular reflectance is acquired when the glass transition temperature is high and the regular reflectance is lowered when the glass transition temperature is low, all drawn and ironed cans can acquire favorable lustrous appearance respectively.

Example 18

Except for that a thickness of an outer surface resin layer is set to 0.1 μm as shown in Table 1, a resin coated Al sheet is prepared in the same manner as the example 12, and drawing and ironing are applied to the resin coated Al sheet in the same manner as the example 1 thus obtaining a drawn and ironed can.

A result obtained by evaluating regular reflectance of the drawn and ironed can in the same manner as the example 1 is shown in Table 1, wherein a can barrel portion exhibits regular reflectance of 53.8% so that the drawn and ironed can acquires extremely favorable lustrous appearance.

Comparison Examples 1 to 4

In the comparison example 1, except for that a thickness of an outer surface resin layer is 3 μm, a drawn and ironed can is obtained by applying drawing and ironing to a resin-coated Al sheet in the same manner as the example 3. In the comparison example 2, except for that a thickness of an outer surface resin layer is 5 μm, a drawn and ironed can is obtained by applying drawing and ironing to resin-coated Al sheet in the same manner as the example 7. In the comparison example 3, except for that a thickness of an outer surface resin layer is 7 μm, a drawn and ironed can is obtained by applying drawing and ironing to resin-coated Al sheet in the same manner as the example 9. In the comparison example 4, except for that a thickness of an outer surface resin layer is 7 μm, a drawn and ironed can is obtained by applying drawing and ironing to a resin-coated Al sheet in the same manner as the example 17.

A result obtained by evaluating regular reflectance of the drawn and ironed can in the same manner as the example 1 is shown in Table 2, wherein can barrel portions exhibit regular reflectances of 13%, 12%, 9%, 9% respectively. None of drawn and ironed cans can acquire sufficient luster respectively.

TABLE 1

| | Example | | | | | |
|---|---|---|---|---|---|---|
| | Al | | | outer surface resin layer | | regular |
| No. | Ra (μm) | number of peaks/mm (>0.1 μm) | kind of resin | film thickness (μm) | glass transition temperature (° C.) | reflectance (%) |
| 1 | 0.5 | 52 | urethane modified polyester | 2 | 106 | 17.2 |
| 2 | 0.5 | 52 | urethane modified polyester | 0.25 | 106 | 38.2 |
| 3 | 0.3 | 45 | urethane modified polyester | 2 | 106 | 22.5 |
| 4 | 0.25 | 43 | urethane modified polyester | 2 | 106 | 25.8 |
| 5 | 0.25 | 43 | urethane modified polyester | 4 | 106 | 20.5 |

TABLE 1-continued

Example

| | | | outer surface resin layer | | | |
|---|---|---|---|---|---|---|
| | | Al | | | glass | regular |
| No. | Ra (μm) | number of peaks/mm (>0.1 μm) | kind of resin | film thickness (μm) | transition temperature (° C.) | reflectance (%) |
| 6 | 0.2 | 40 | urethane modified polyester | 2 | 106 | 27.8 |
| 7 | 0.2 | 40 | urethane modified polyester | 4 | 106 | 18.7 |
| 8 | 0.2 | 40 | urethane modified polyester | 0.25 | 106 | 42.2 |
| 9 | 0.15 | 38 | urethane modified polyester | 6 | 106 | 16.5 |
| 10 | 0.15 | 38 | urethane modified polyester | 2 | 106 | 28.4 |
| 11 | 0.15 | 38 | urethane modified polyester | 0.25 | 106 | 45.3 |
| 12 | 0.03 | 17 | urethane modified polyester | 0.25 | 106 | 50.4 |
| 13 | 0.03 | 3 | urethane modified polyester | 0.25 | 106 | 56.5 |
| 14 | 0.03 | 17 | polyester I | 0.25 | 84 | 44.3 |
| 15 | 0.03 | 17 | polyester II | 0.25 | 40 | 31.6 |
| 16 | 0.03 | 17 | polyester III | 0.25 | 18 | 21.5 |
| 17 | 0.03 | 17 | polyether sulfone | 0.25 | 225 | 52.2 |
| 18 | 0.03 | 17 | urethane modified polyester | 0.1 | 106 | 53.8 |

TABLE 2

Comparison example

| | | | outer surface resin layer | | | |
|---|---|---|---|---|---|---|
| | | Al | | | glass | regular |
| No. | Ra (μm) | number of peaks/mm (>0.1 μm) | kind of resin | film thickness (μm) | transition temperature (° C.) | reflectance (%) |
| 1 | 0.3 | 52 | urethane modified polyester | 3 | 106 | 13 |
| 2 | 0.2 | 52 | urethane modified polyester | 5 | 106 | 12 |
| 3 | 0.15 | 38 | urethane modified polyester | 7 | 106 | 9 |
| 4 | 0.15 | 38 | polyether sulfone | 7 | 225 | 9 |

INDUSTRIAL APPLICABILITY

According to the resin-coated Al sheet for a drawn and ironed can and the method of manufacturing a drawn and ironed can of the present invention, the drawn and ironed can whose barrel portion exhibits the excellent luster can be formed by dry lubrication without using a liquid coolant and hence, the present invention has the extremely high industrial applicability.

What is claimed is:

1. A resin-coated Al sheet for a drawn and ironed can exhibiting excellent luster, the resin-coated Al sheet to be formed into a can body by drawing and ironing, wherein an Al surface which forms an outer surface of the can and has an arithmetical mean roughness (Ra) of 0.5 μm or less is covered with an outer surface resin layer having a thickness which falls within a range of 0.1 μm to 2 μm, the resin layer having a Martens hardness of 50 N/mm$^2$ or more at 28° C. and a rapture elongation of 5% or more at 25° C. when measured in accordance with ASTM, D-882, and wherein a glass transition temperature of the outer surface resin layer is 40° C. or more;

a regular reflectance of the outer surface of the drawn and ironed can is 28.4% or more; and wherein the Al surface has a plurality of recesses and protrusions where the recesses and the protrusions define a surface roughness profile and where the surface roughness profile has a center line;

a number of unique pairs of recesses and protrusions meeting a criteria is no more than 10/mm, wherein the criteria for the unique pair is defined by the recess of the unique pair extending at least −0.1 μm beneath the center line and the protrusion of the unique pair is when a following protrusion extends above the center line, such that each recess and protrusion belonging to the unique pair meeting the criteria is counted only once.

2. A method of manufacturing a drawn and ironed can exhibiting excellent luster, wherein a resin-coated Al sheet in which an Al surface which forms an outer surface of the can and has an arithmetical mean roughness (Ra) of 0.5 μm or less is covered with an outer surface resin layer having a thickness which falls within a range of 0.02 μm to 2 μm, a Martens hardness of 50 N/mm$^2$ or more at 28° C. and a rapture elongation of 5% or more at 25° C. when measured in accordance with ASTM, D-882, a glass transition temperature of 40° C. or more;

is subjected to drawing and ironing thus forming the resin-coated Al sheet into a can body, wherein the drawing and ironing are performed such that regular reflectance of a barrel portion of the can body after working is 15% or more; and wherein the Al surface has a plurality of recesses and protrusions where the recesses and the protrusions define a surface roughness profile and where the surface roughness profile has a center line;

a number of unique pairs of recesses and protrusions meeting a criteria is no more than 10/mm, wherein the criteria is defined by the recess of the unique pair extending at least −0.1 μm beneath the center line and the protrusion of the unique pair is when a following protrusion extends above the center line, such that each recess and protrusion belonging to the unique pair meeting the criteria is counted only once.

* * * * *